(12) United States Patent
Amin

(10) Patent No.: US 8,769,890 B2
(45) Date of Patent: Jul. 8, 2014

(54) DEVICE FOR FEEDING ONE OR MORE LINES THROUGH AN OPENING IN A WALL OR A FLOOR

(75) Inventor: Bhavik Amin, Berlin (DE)

(73) Assignee: Daxten Limited, Clonmel, CO, Tipperary (IE)

( * ) Notice: Subject to any disclaimer, the term of this patent is extended or adjusted under 35 U.S.C. 154(b) by 0 days.

(21) Appl. No.: 13/522,720

(22) PCT Filed: Jan. 24, 2011

(86) PCT No.: PCT/DE2011/000081
§ 371 (c)(1),
(2), (4) Date: Jul. 18, 2012

(87) PCT Pub. No.: WO2011/088828
PCT Pub. Date: Jul. 28, 2011

(65) Prior Publication Data
US 2012/0291221 A1    Nov. 22, 2012

(30) Foreign Application Priority Data
Jan. 25, 2010 (DE) .......................... 10 2010 005 950

(51) Int. Cl.
*E04C 2/52* (2006.01)
*H02G 3/18* (2006.01)
(52) U.S. Cl.
USPC ........................................ 52/220.8; 174/650
(58) Field of Classification Search
CPC ................. F16L 5/04; F16L 5/02; H02G 3/22
USPC ............ 16/2.1, 2.2; 49/365, 463, 466; 52/19, 52/27, 73, 192, 198, 199, 204.1, 220.1, 52/220.7, 220.8, 273, 503; 160/19; 174/152 R, 152 G, 153 G, 650; 248/56; 277/55, 355; 439/274, 275, 587, 589; D08/356; 220/378
See application file for complete search history.

(56) References Cited

U.S. PATENT DOCUMENTS 2,028,902 A * 1/1936 Fitch .............................. 160/117
2,650,547 A * 9/1953 Anderson et al. .............. 105/4.1
(Continued)

FOREIGN PATENT DOCUMENTS

DE    10151812    6/2003
DE    10216650    10/2003
(Continued)

OTHER PUBLICATIONS

International Search Report for corresponding International Application No. PCT/DE2011/000081 mailed Sep. 26, 2012.

*Primary Examiner* — Charles A Fox
*Assistant Examiner* — Joseph J Sadlon
(74) *Attorney, Agent, or Firm* — Renner, Otto, Boisselle & Sklar, LLP

(57) ABSTRACT

The invention relates to a device (1) for feeding one or more lines through an opening in a wall or a floor, comprising a frame (2) arranged in the opening, wherein the frame (2) forms one or more feed-through openings (3), which can be closed by means of one or more covers (6), and wherein brush bristles (11) are reversibly attached by attachment means to the inner wall (9) that forms the inner edge (4) of the feed-through opening (3), wherein the brush bristles (11) are arranged in such a way that the brush bristles cover the feed-through opening (3).

4 Claims, 4 Drawing Sheets

(56) References Cited

U.S. PATENT DOCUMENTS

| | | | |
|---|---|---|---|
| 3,329,762 A * | 7/1967 | Miller | 174/659 |
| 4,940,858 A * | 7/1990 | Taylor et al. | 174/152 GM |
| 4,967,041 A * | 10/1990 | Bowman | 174/135 |
| 5,167,047 A * | 12/1992 | Plumley | 174/153 G |
| 5,318,309 A * | 6/1994 | Tseng et al. | 277/347 |
| 5,363,906 A * | 11/1994 | Borowy | 165/9 |
| 5,486,664 A | 1/1996 | Lamp et al. | |
| 5,546,895 A | 8/1996 | Brown | |
| 6,545,215 B2 * | 4/2003 | Young et al. | 174/490 |
| 6,632,999 B2 * | 10/2003 | Sempliner et al. | 174/659 |
| 6,721,483 B2 * | 4/2004 | Grubish et al. | 385/135 |
| 6,923,783 B2 * | 8/2005 | Pasqualucci | 604/27 |
| 6,989,488 B2 * | 1/2006 | Valenziano | 174/483 |
| 7,427,050 B2 * | 9/2008 | Stahl et al. | 248/56 |
| 7,507,912 B1 | 3/2009 | Sempliner et al. | |
| 7,534,965 B1 * | 5/2009 | Thompson | 174/153 G |
| 8,178,795 B2 * | 5/2012 | Roy | 174/666 |
| 8,505,923 B2 * | 8/2013 | Ferryman et al. | 277/355 |
| 8,572,913 B2 * | 11/2013 | Stubblefield et al. | 52/220.1 |
| 2012/0042592 A1 * | 2/2012 | Ericsson | 52/220.1 |

FOREIGN PATENT DOCUMENTS

| | | |
|---|---|---|
| DE | 102 10 754 | 5/2008 |
| EP | 1 209 786 | 5/2002 |
| EP | 2 065 992 | 6/2009 |
| WO | 03/023922 | 3/2003 |

\* cited by examiner

DEVICE FOR FEEDING ONE OR MORE LINES THROUGH AN OPENING IN A WALL OR A FLOOR

The invention relates to a device for feeding one or more lines through an opening in a wall or a floor, having a frame arranged in the opening.

In many situations, lines have to be fed through walls, floors, roofs or similar partitions. In this case, the lines are frequently fed through holes which either remain open or are closed with sealing material such as grouting, plaster or silicone. However, this has the result that if the holes are not sealed a gas and/or temperature exchange through the holes is possible. If the holes are sealed, it is only possible to replace the lines by removing the sealing material.

When lines such as power lines, network cables or telephone lines are laid, it is often necessary to feed them through table tops, cabinet walls, building walls, housing covers, flooring or false floors. When this is done, the lines have to be laid such that it is possible to replace them quickly but the feed-through opening is sufficiently well closed off for no temperature exchange or soiling to be able to take place through the feed-through opening.

DE 101 51 812 C1 discloses a device for inserting cables though a cable insert opening made in a housing wall, in particular a floor opening in a switch cabinet, having a cable insertion bushing which can be put into the cable insert opening. Here, the cable insertion bushing comprises an annular base body which can be put into the cable insertion opening in the housing wall and bears on its inner wall radially projecting brush bristles of differing length, as a result of which sealing of the inserted cables is achieved. With this arrangement, cables can be pushed through the layers of brush bristles. During this, the brush bristles are deflected and bent back. Because of their inherent elasticity, the brush bristles hug the cables and seal them on all sides, regardless of the external contour created by the grouping of the cable bundle. If cables are removed, the brush bristles that are freed automatically move back into place.

A disadvantage of this construction is that the brush bristles cannot be replaced individually if they are soiled or damaged. Rather, it is necessary to replace the entire device. Moreover, as a function of the construction the device is designed such that it projects out of the surface having the opening into which it is mounted and so, in the case of installation in flooring, presents an obstacle.

It is thus the object of the invention to provide a device of the type mentioned at the outset, in which one or more lines can be fed through an opening in a wall or a floor and which enables components, in particular the brush bristles, to be replaced easily.

The object of the present invention is achieved by a device in which a frame forms one or more feed-through openings that may be closed by one or more covers, and wherein brush bristles are reversibly fixed to the inner wall, which forms the inner rim of the feed-through opening, by fixing means, wherein the brush bristles are arranged such that they cover the feed-through opening.

In the sense used in the application, lines are for example cables or cable lines, pipes, LAN cables, hoses, rods, ropes, fiber optic lines or similar strands that may be fed through an opening in a wall or a floor, wherein the possibility that soiling or a heat exchange will take place through the opening is to be avoided.

The opening (or a cutout) may in this case be any desired opening in a wall or a floor, wherein the wall may be a building wall, a roof, a wall of a housing or a piece of furniture, for example a server cabinet or switch cabinet, and the floor may be flooring, a false floor, in particular the false floor of a computer center, or a floor of a cabinet, housing or similar.

The device according to the invention for feeding lines may be covered or closed by the cover, for example a (safety) panel, when it is not being used for feeding lines. This has the advantage that when the device is installed on flooring or a false floor, the opening in the flooring or false floor is closed, so it can be walked over.

So that the device has the required stability, the frame and the cover are made of a solid synthetic material or a metal such as steel, aluminum, iron or brass.

In the event of installation in a wall or ceiling, too, it may be useful to close the opening when it is not used, in order for example to prevent an exchange of air and/or heat. In the event of installation in a wall or a (housing) ceiling, the cover or frame includes securing devices, such as a lock or a clamping mechanism, by means of which the cover is prevented from falling out.

It is an advantage of the device according to the invention that damaged or soiled brush bristles can easily be removed, since the brush bristles are reversibly connected to the inner wall of the feed-through opening by fixing means.

Preferably, the fixing means are clamps, screws, bolts and/or pins. For this purpose, bundles of the brush bristles or a brush bristle strip is/are positioned in recesses or a brush bristle duct on the inside of the feed-through opening and is/are prevented from falling out using the fixing means. A brush bristle strip with a rubber strip may for example be squeezed/clamped in a brush duct in order to fix it. However, it is also conceivable to lock a brush bristle strip having a bore, by means of a bolt or pin that is pushed through the bore. It is furthermore conceivable to prevent the brush bristles from being detached from the inner wall by means of screws.

Preferably, the fixing means may be operated through the feed-through opening, with the result that the brush bristles may be replaced through the feed-through opening. The term "operated through the feed-through opening" means for example that when screws are used they are arranged such that they can be tightened or loosened through the feed-through opening. To do this the cover must first be removed.

As a result of an arrangement of this kind, it is not necessary to completely dismantle the device for maintenance purposes. Moreover, additional brush bristles may be secured subsequently without the need to completely disassemble or dismantle the device.

Preferably, the cover closes off the feed-through opening such that it is gas-tight. This has the advantage that the emission of gas such as air through the feed-through opening is reduced or entirely prevented. For this purpose, the cover, or the inner wall of the feed-through opening on which the cover lies, may be provided with a seal, for example a rubber seal.

Preferably, the cover has at least one gripping opening. A gripping opening of this kind makes it easier to raise the cover when it is opened. For this purpose, one or more gripping openings, which are designed such that fingers may grip them, may be arranged in the cover. An embodiment having two gripping openings has proved advantageous, since gripping with the thumb and forefinger of one hand makes it easy to open the cover. Thus, the cover may be opened and closed without tools.

It is further preferable to mount on one side of the cover a housing that prevents gas exchange through the gripping openings. The housing is arranged below the gripping holes, with the result that the cover remains gas-tight despite the gripping openings.

Another possibility for raising the cover is a handle, which may be counter-sunk in the cover.

Preferably, the inner wall of the feed-through opening has a ledge on which the cover is reversibly arranged. This ledge prevents the cover from slipping.

In a preferred embodiment of the invention, the frame and the cover, which is arranged on the ledge on the inner wall of the feed-through opening, are in one plane. As a result of this, the device forms a flat surface, which is advantageous not only for aesthetic reasons but also to prevent injury.

In a further preferred embodiment, the frame is countersunk in the opening in a wall or the floor, with the result that the device and the wall or the floor are in one plane. In particular when the device according to the invention is installed on flooring, this has the advantage that stumbling over the device is prevented, with the result that it is also possible to position the device in the middle of a room, for example. Moreover, cleaning the wall or the floor is made easier, since cleaning equipment (cloths, vacuum cleaners, etc.) does not knock against the device or get caught on it.

To secure the device in the opening, it is countersunk in the wall or the floor to such an extent that the floor and surface of the device are in one plane. Fixing is then performed by screwing, latching or gluing the outer rim of the device to the inner rim of the opening in the wall or the floor.

However, it is also possible for the device to be a module of a (housing) wall or a (housing) floor that is composed of panels. Thus, the device may for example be the floor panel of a server cabinet and/or part of a false floor.

The invention will be described in more detail below with reference to figures. Individually:

FIGS. 1a to 1d show the device 1 according to the invention from various viewing angles.

Figure 1:
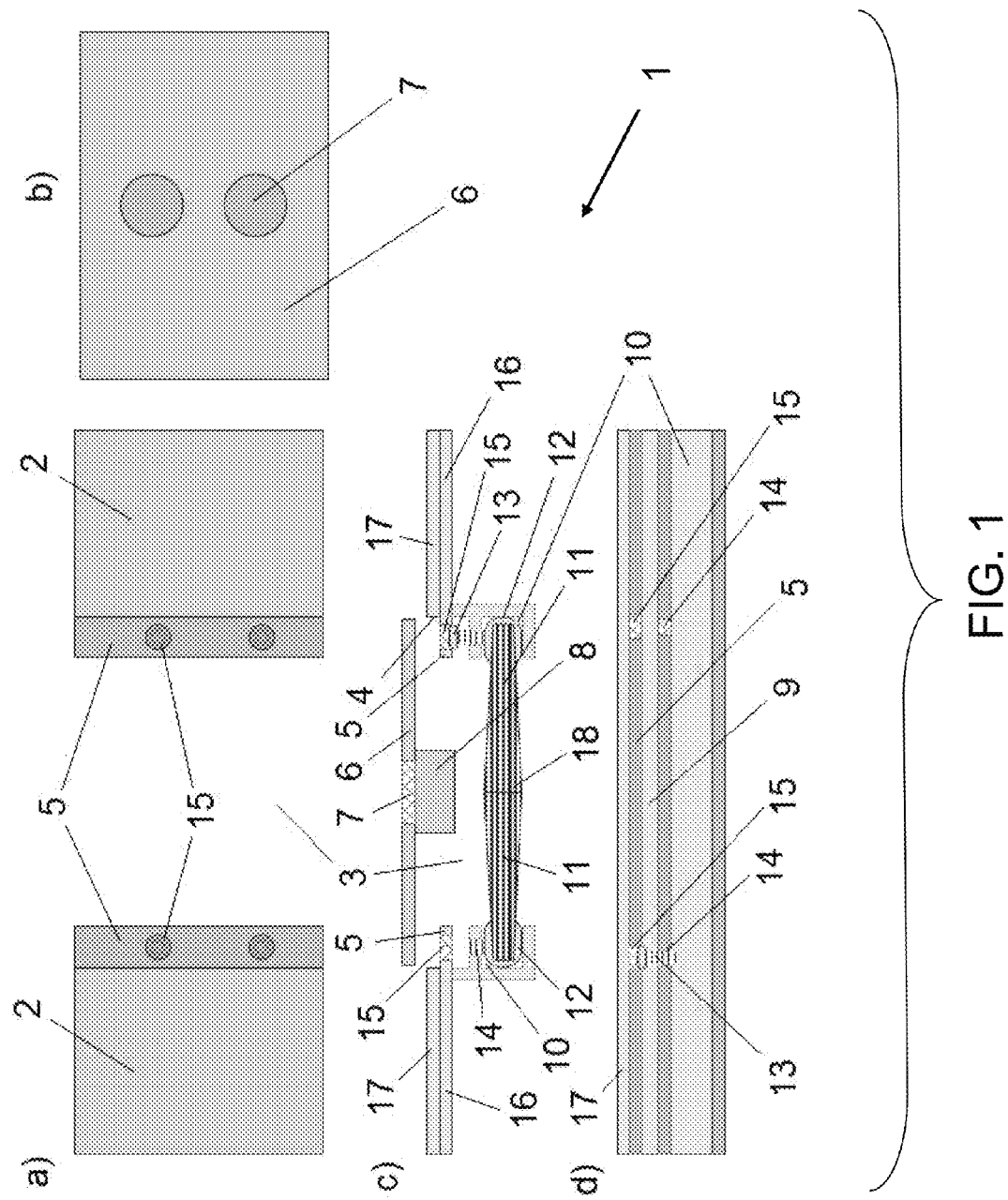
FIGS. 1a-1d show illustrations of the device according to the invention.

FIG. 1a shows a detail of the frame 2, which has a feed-through opening 3 in its center. On the inner rims 4, the inner wall 9 of the feed-through opening 3 has a ledge 5 for receiving the cover 6, which is shown in FIG. 1b.

The cover 6, which is shown in FIG. 1b, has two gripping openings 7, by means of which it can be raised. The cover 6 is dimensioned to cover the feed-through opening 3 such that it precisely fits it. The feed-through opening 3 and the cover 6 (illustrated in FIG. 1b) have a four-sided base shape, but it is also conceivable for the base shape to take a different form, for example round or oval.

FIG. 1c shows a cross section through the device 1.

As shown in FIG. 1c, a housing 8 is arranged below the cover 6 in the area of the gripping openings 7. The housing 8 downwardly closes off the gripping openings 7 such that they are gas-tight, with the result that no gas exchange can take place through the gripping openings 7. Moreover, when the fingers are inserted into the gripping openings 7, the housing 8 prevents them from reaching into the feed-through opening 3.

In the illustration that is shown in FIG. 1c, the cover 6 is not lying on the ledges 5 on the inner wall 9 of the feed-through opening 3 but, in this schematic illustration, is illustrated in a raised position above the feed-through opening 3.

According to the invention, the cover 6 lies on the ledges 5 on the inner walls 9 such that it can be secured without tools. In this case, the cover 6 ends flush with the inner rim 4 of the frame 2.

However, also conceivable are embodiments in which the cover 6 is secured by one or more hinges, screws or other means that are known to those skilled in the art.

As shown in FIG. 1c, the cover 6, and indeed the entire device 1, is constructed such that it ends in a plane with the surface 16 of the frame 2 (panel surface).

The inner walls 9 of the feed-through opening 3 are constructed such that they have recesses or at least one brush bristle duct 10 in which the brush bristles 11 and/or a brush bristle strip 12 may be reversibly fixed using fixing means. In the illustration that is shown in FIG. 1c, a brush bristle strip 12 is arranged in the brush bristle duct 10 on the left and right sides of the inner wall 9 and is fixed using fixing means, in this case screws 13. For fixing the screws 13, the upper region of the brush bristle duct 10 has a thread 14. However, it is also possible for the thread 14 to be arranged in the ledge 5.

The brush bristles 11 are arranged such that the entire feed-through opening 3 is covered by brush bristles 11. For this purpose, the brush bristles are arranged such that their ends 18 are in contact with one another or overlap one another entirely or in part.

FIG. 1d shows a detail of the inner wall 9 of the feed-through opening 3, with the brush bristle duct 10 and the ledge 5, in which bores 15 are located for receiving the fixing means. Also conceivable are embodiments of the device 1 according to the invention in which a plurality of brush bristle ducts 10 are arranged parallel to one another in the inner wall 9, in order to enable a plurality of layers of brush bristles 11 to be received.

The brush bristles 11 are made of synthetic material such as nylon, or natural materials.

Figure 2:
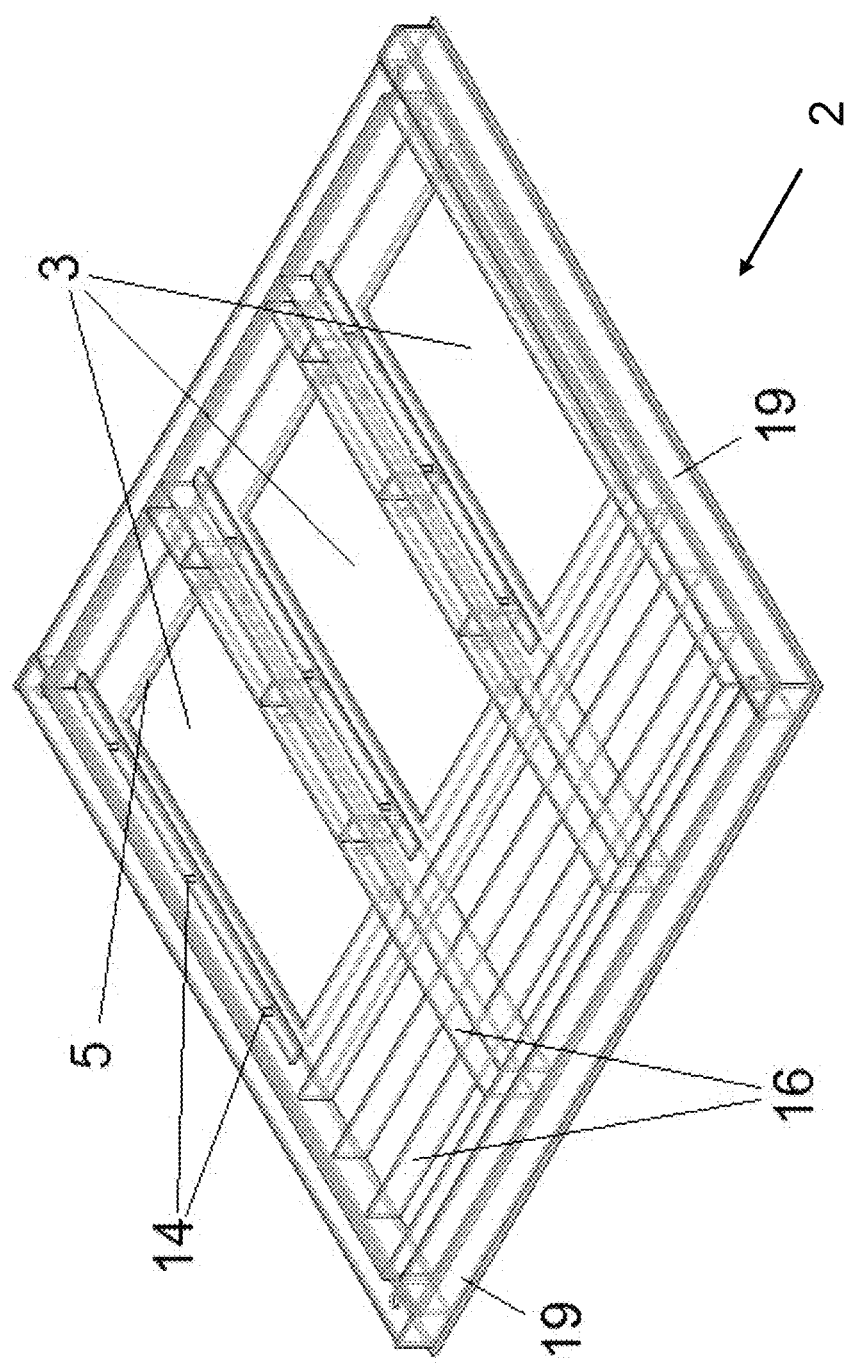
FIG. 2 shows a three-dimensional illustration of the underside of the frame of the device according to the invention.

FIG. 2 shows a three-dimensional illustration of the frame 2 from the underside, that is to say from the side that points downward when the device 1 is mounted in flooring. In the embodiment that is shown in FIG. 2, the frame 2 has three feed-through openings 3. The number of feed-through openings 3 may vary, so embodiments having one, two, three or more feed-through openings 3 are conceivable. In order to cover the feed-through openings 3, they are closed by one or more covers 6. Here, one cover 6 may be used to close one or indeed a plurality of feed-through openings 3.

The frame 2 is strengthened on the underside by (transverse and/or longitudinal) struts 16. The ledge 5 and/or the inner wall 9 may also be formed by struts 16, as a result of which the frame 2 is additionally stabilized.

The frame 2 is fixed by means of its outer rim 19 to the inner rim of the opening in the wall or a floor, for example by being screwed, clamped or latched.

Figure 3:
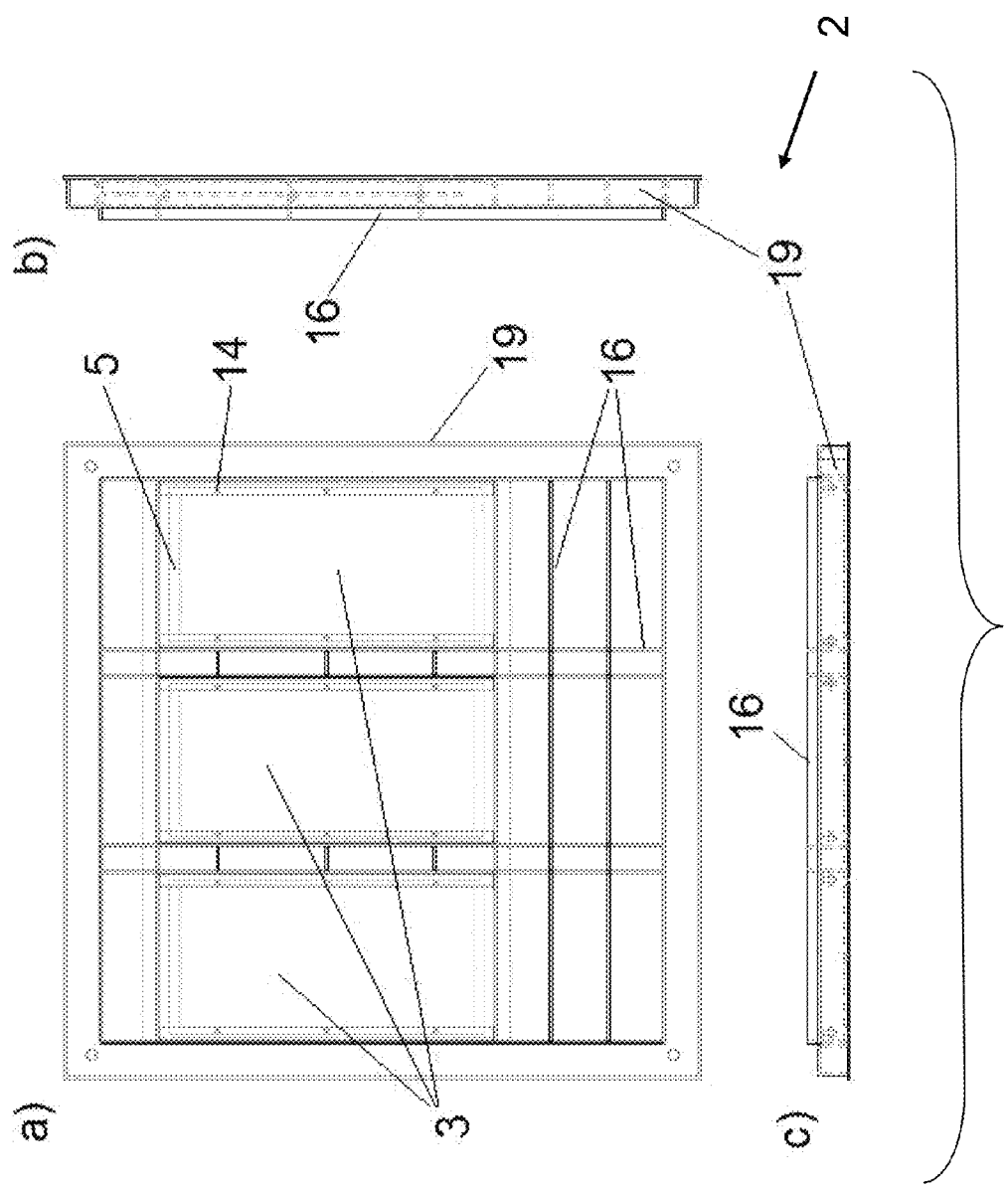
FIGS. 3a-3c show illustrations of the frame and side views of the frame.

FIGS. 3a to 3c show diagrammatic illustrations of the frame 2 of the device 1 and two side views of the frame 2.

Figure 4:
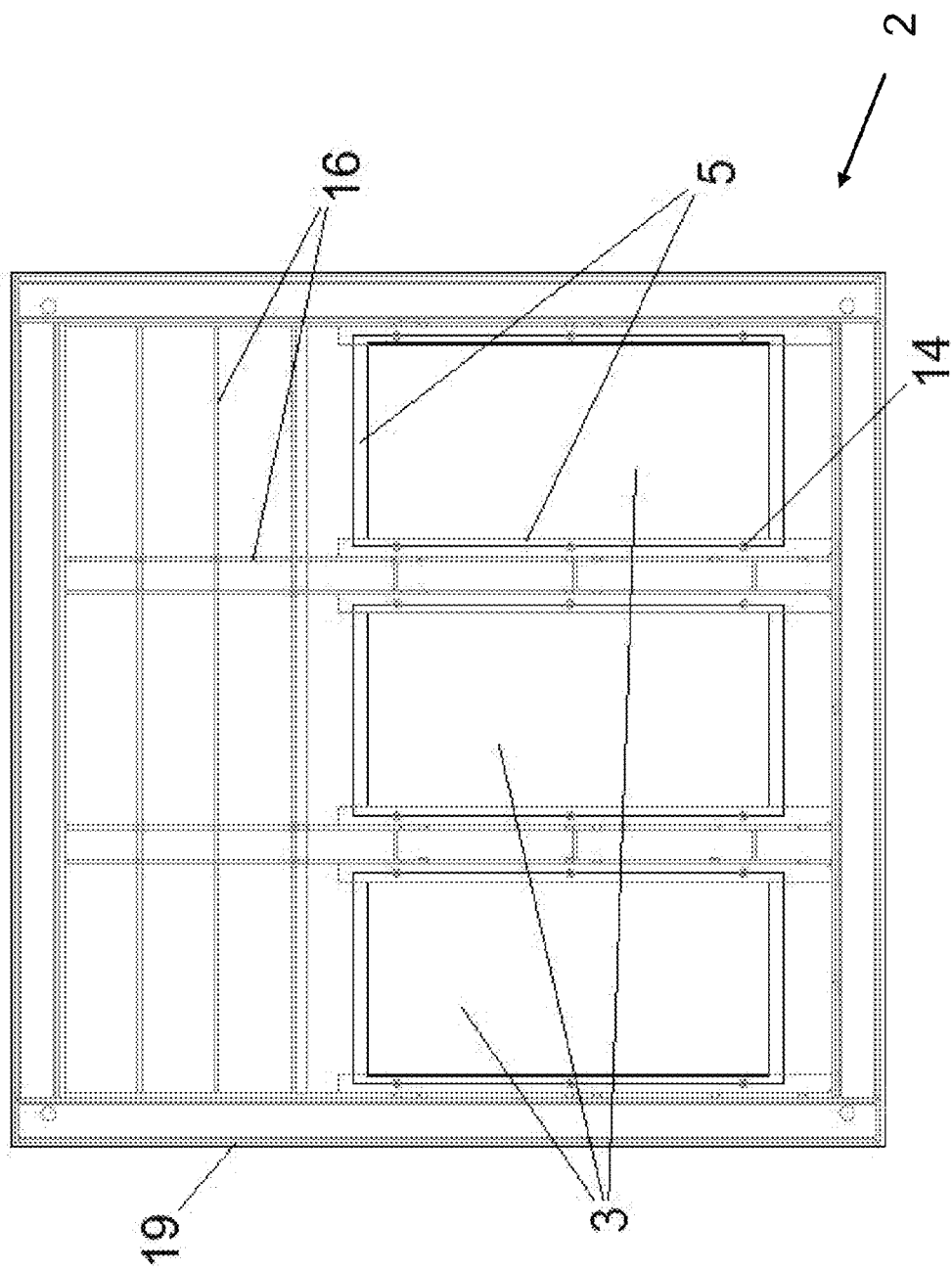
FIG. 4 shows an illustration of the upper side of the frame and the device according to the invention.

FIG. 4 shows a sketch of the upper face 17 of the frame 2 with three feed-through openings 3. The size and shape of the feed-through openings 3 may be made different as required. For server housing walls, a feed-through opening 3 of between 200 mm×125 mm to 295 mm×125 mm has proved suitable.

LIST OF REFERENCE NUMERALS

1 Device
2 Frame

3 Feed-through opening
4 Inner rim (of the feed-through opening)
5 Ledge
6 Cover
7 Gripping opening
8 Housing
9 Inner wall
10 Brush bristle duct
11 Brush bristles
12 Brush bristle strip
13 Screw
14 Thread
15 Bore
16 Strut
17 Upper face of the frame
18 Ends (of the brush bristles)
19 Outer rim (of the frame)

The invention claimed is:

1. A device for feeding one or more lines through an opening in a wall or a floor, having a frame arranged in the opening, characterized in that the frame forms one or more feed-through openings that may be closed by one or more covers, and
wherein brush bristles are removably fixed to an inner wall, which forms an inner rim of the one or more feed-through openings, by fixing means,
wherein the brush bristles are arranged such that they cover the one or more feed-through openings, and wherein a cover has at least one gripping opening and there is mounted on one side of the cover a housing that prevents gas exchange through the at least one gripping opening.

2. The device as claimed in claim 1, wherein the inner wall of the feed-through opening has a ledge on which the cover is removably arranged.

3. The device as claimed in claim 2, wherein the frame and the cover, which is arranged on the ledge on the inner wall of the feed-through opening, have upper surfaces that are in one plane.

4. The device as claimed in claim 1, wherein the frame is configured to be countersunk in the opening in the wall or the floor, with the result that the device and the wall or the floor are in one plane.

* * * * *